United States Patent
Chen (10) Patent No.: US 12,058,068 B2
(45) Date of Patent: Aug. 6, 2024

(54) OPTIMIZED METHOD FOR WI-FI BAND STEERING

(71) Applicant: ARRIS Enterprises LLC, Suwanee, GA (US)

(72) Inventor: Bo Chen, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 430 days.

(21) Appl. No.: 17/431,228

(22) PCT Filed: Aug. 26, 2020

(86) PCT No.: PCT/CN2020/111372
§ 371 (c)(1),
(2) Date: Aug. 16, 2021

(87) PCT Pub. No.: WO2022/040978
PCT Pub. Date: Mar. 3, 2022

(65) Prior Publication Data
US 2022/0303085 A1   Sep. 22, 2022

(51) Int. Cl.
*H04L 5/00* (2006.01)
*H04W 72/044* (2023.01)
*H04W 72/0453* (2023.01)

(52) U.S. Cl.
CPC .......... *H04L 5/0048* (2013.01); *H04L 5/0023* (2013.01); *H04W 72/0453* (2013.01); *H04W 72/046* (2013.01)

(58) Field of Classification Search
CPC ... H04L 5/0048; H04L 5/0023; H04L 43/028; H04W 72/0453; H04W 72/046; H04W 36/00837; H04W 36/06; H04W 36/36; H04W 84/12; H04W 8/24; H04W 36/22; H01H 1/605
See application file for complete search history.

(56) References Cited

U.S. PATENT DOCUMENTS

| | | | |
|---|---|---|---|
| 2005/0231858 A1* | 10/2005 | Komatsu | H01H 1/605 361/2 |
| 2012/0051353 A1* | 3/2012 | Aragon | H04W 36/22 370/338 |
| 2016/0360489 A1 | 12/2016 | Boodannavar et al. | |
| 2017/0111244 A1* | 4/2017 | Strater | H04L 43/028 |
| 2017/0135104 A1 | 5/2017 | Emmanuel et al. | |
| 2017/0164246 A1* | 6/2017 | Ganu | H04W 8/24 |
| 2018/0192329 A1 | 7/2018 | Medapalli et al. | |
| 2020/0107224 A1 | 4/2020 | Kamath et al. | |

* cited by examiner

*Primary Examiner* — Kiet Tang
(74) *Attorney, Agent, or Firm* — Wenderoth, Lind & Ponack, L.L.P.

(57) ABSTRACT

An access point device associates with a client device on a first band and on a second band, the access point device can steer the client device from the first band to the second band or from the second band to the first band based on a signal parameter offset value. The access point device can determine a first signal parameter value associated with the client device on the first band and a second signal parameter value associated with association of the client device on the second band. A home network controller device is enabled to: count n number of times, within a predetermined time period, that the client device is steered from the first band to the second band and vice versa; and instruct the access point device to increase the signal parameter offset value when n is greater than a predetermined value, m.

12 Claims, 5 Drawing Sheets

OPTIMIZED METHOD FOR WI-FI BAND STEERING

BACKGROUND

Embodiments of the invention relate to client steering between wireless bands.

SUMMARY

Aspects of the present invention are drawn to a home network controller device for use with an access point device and a client device, the access point device being configured to associate with the client device on a first band and on a second band, the access point device being configured to steer the client device from the first band to the second band based on a signal parameter offset value, σ, and to steer the client device from the second band to the first band based on σ, the access point device being configured to determine a first signal parameter value associated with association of the client device on the first band and to determine a second signal parameter value associated with association of the client device on the second band. The home network controller device includes: a memory; and a processor configured to execute instructions stored on the memory to cause the home network controller device to: count a number, n, of times, within a predetermined period of time, that the client device is steered from the first band to the second band and is steered from the second band to the first band; and instruct the access point device to increase σ when n is greater than a predetermined value, m.

In some embodiments, the processor is further configured to execute instructions stored on the memory to additionally cause the home network controller device to: generate a warning message suggesting that a user of the client device move; and transmit the warning message to the client device by way of the access point device.

In some embodiments, the signal parameter is selected from a group of signal parameters consisting of signal strength indicator (RSSI) level, physical layer (PHY) rate, amplitude level, number of packets dropped, and a combination thereof.

In some embodiments the processor is further configured to execute instructions stored on the memory to additionally cause the home network controller device to count the number, n, of times, that the client device is steered from the first band to the second band and is steered from the second band to the first band by way of a management information base or a TR-069 management protocol.

Aspects of the present invention are drawn to a method of using a home network controller device for use with an access point device and a client device, the access point device being configured to associate with the client device on a first band and on a second band, the access point device being configured to steer the client device from the first band to the second band based on a signal parameter offset value, σ, and to steer the client device from the second band to the first band based on σ, the access point device being configured to determine a first signal parameter value associated with association of the client device on the first band and to determine a second signal parameter value associated with association of the client device on the second band. The method includes: counting, via a processor configured to execute instructions stored on a memory, a number, n, of times, within a predetermined period of time, that the client device is steered from the first band to the second band and is steered from the second band to the first band; and instructing, via the processor, the access point device to increase σ when n is greater than a predetermined value, m.

In some embodiments, the method further includes: generating, via the processor, a warning message suggesting that a user of the client device move; and transmitting, via the processor, the warning message to the client device by way of the access point device.

In some embodiments, the signal parameter is selected from a group of signal parameters consisting of RSSI level, PHY rate, amplitude level, number of packets dropped, and a combination thereof.

In some embodiments, the method includes counting, via the processor, the number, n, of times, that the client device is steered from the first band to the second band and is steered from the second band to the first band by way of a management information base or a TR-069 management protocol.

Aspects of the present invention are drawn to a non-transitory, computer-readable media having computer-readable instructions stored thereon, the computer-readable instructions being capable of being read by a home network controller device for use with an access point device and a client device, the access point device being configured to associate with the client device on a first band and on a second band, the access point device being configured to steer the client device from the first band to the second band based on a signal parameter offset value, σ, and to steer the client device from the second band to the first band based on σ, the access point device being configured to determine a first signal parameter value associated with association of the client device on the first band and to determine a second signal parameter value associated with association of the client device on the second band, wherein the computer-readable instructions are capable of instructing the home network controller device to perform the method including: counting, via a processor configured to execute instructions stored on a memory, a number, n, of times, within a predetermined period of time, that the client device is steered from the first band to the second band and is steered from the second band to the first band; and instructing, via the processor, the access point device to increase σ when n is greater than a predetermined value, m.

In some embodiments, the computer-readable instructions are capable of instructing the home network controller device to perform the method further including: generating, via the processor, a warning message suggesting that a user of the client device move; and transmitting, via the processor, the warning message to the client device by way of the access point device.

In some embodiments, the computer-readable instructions are capable of instructing the server device to perform the method wherein the signal parameter is selected from a group of signal parameters consisting of RSSI level, PHY rate, amplitude level, number of packets dropped, and a combination thereof.

In some embodiments, the computer-readable instructions are capable of instructing the server device to perform the method further including counting, via the processor, the number, n, of times, that the client device is steered from the first band to the second band and is steered from the second band to the first band by way of a management information base or a TR-069 management protocol.

BRIEF SUMMARY OF THE DRAWINGS

The accompanying drawings, which are incorporated in and form a part of the specification, illustrate example embodiments and, together with the description, serve to explain the principles of the invention. In the drawings.

DETAILED DESCRIPTION

In a wireless network, a home network controller (HNC) controls APDs within the wireless network. The HNC may perform tasks such as steering client devices, such as a cell phone, from one APD, such as a Wi-Fi extender, to another APD.

Conventional operation of an HNC includes determining when to steer a client device that is associated with an APD between 2.4G and 5G wireless bands, due to poor internet service for the client devices. However, sometimes a client device may be steered an excessive number of times within a predetermined time period. This is a problem, as every time a client is steered from one wireless band to another, it must disassociate from the network and then re-associate to the network. This causes constant disconnections, and overall poor user experience.

What is needed is a system and method for preventing multiple unacceptable wireless client steering occurrences.

A system and method in accordance with the present disclosure prevents multiple unacceptable wireless client steering occurrences.

In accordance with the present disclosure, the HNC will count the number of band steering occurrences within a predetermined time period. If the client device is steered too many times within that time frame, the client is unacceptably being steered. A signal parameter offset value, σ, will be for a connected client device. This parameter offset value will be used as a threshold to determine whether the client should be steered from one wireless band to another wireless band of and APD. If a client is being bounced between wireless bands an unacceptable number of times within the predetermined time period, σ will be increased. The increase in σ will decrease the number of times that the client device is steered back and forth between two bands of an APD.

An example system and method for preventing unacceptable repeated band steering in accordance with aspects of the present disclosure will now be described in greater detail with reference to FIGS. 1-3B.

Imagine a scenario where a user's client device is connected to a Wi-Fi network. Further, suppose this client device seems to have poor reception to the Wi-Fi band with which it is connected. This client device will then be steered to another Wi-Fi band to stablish a better connection. However, the client device continues to have poor reception, and bounces back and forth between the two wireless bands provided by the APD. This will be described with greater detail in reference to FIG. 1.

Figure 1:
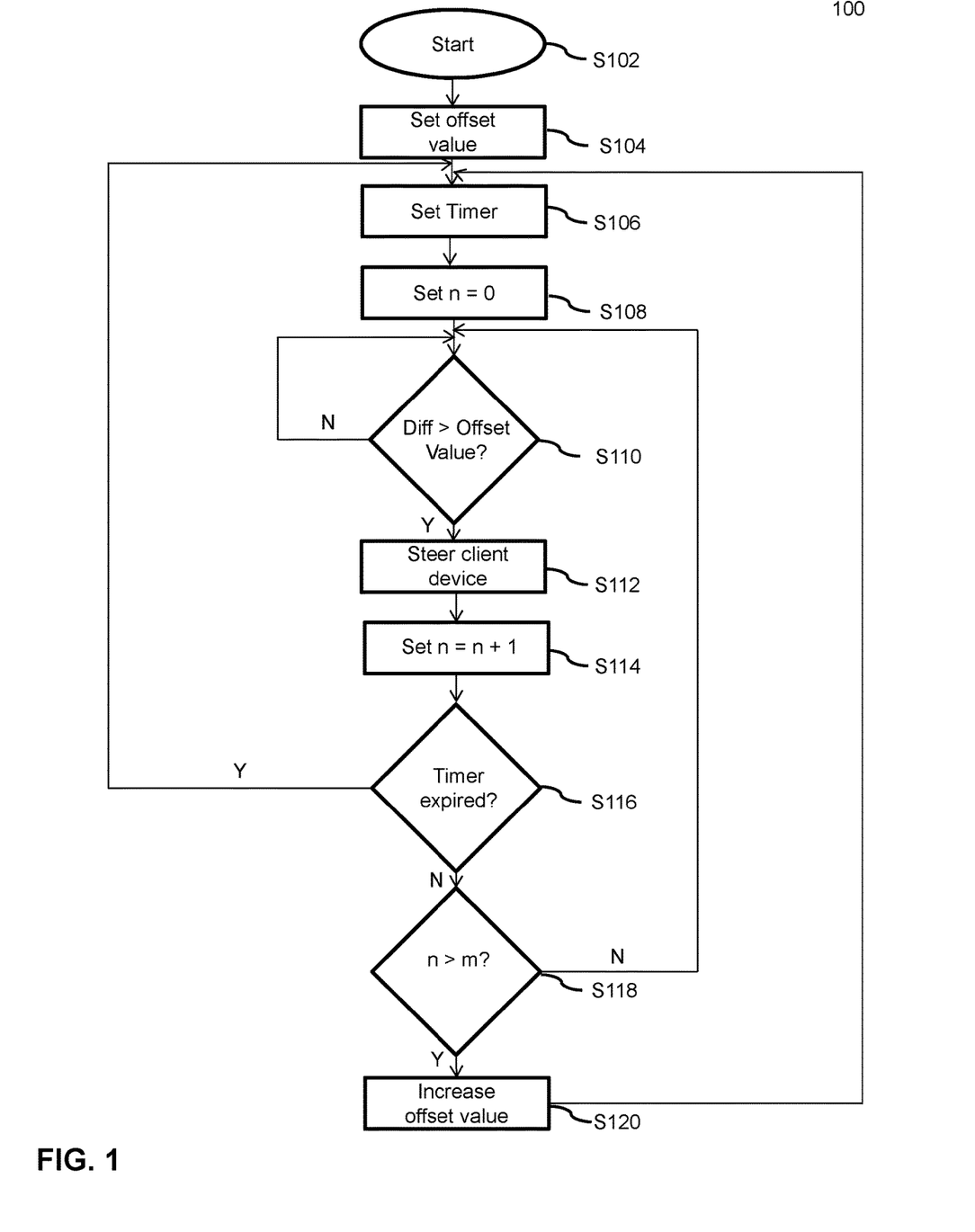
FIG. 1 illustrates an algorithm to be executed by a processor for Wi-Fi band steering in accordance with aspects of the present invention.

FIG. 1 illustrates an algorithm 100 to be executed by a processor for Wi-Fi band steering in accordance with aspects of the present invention.

As shown in the figure, method 100 starts (S102), and a σ is set (S104). This will be described with greater detail in reference to FIG. 2A.

Figure 2A:
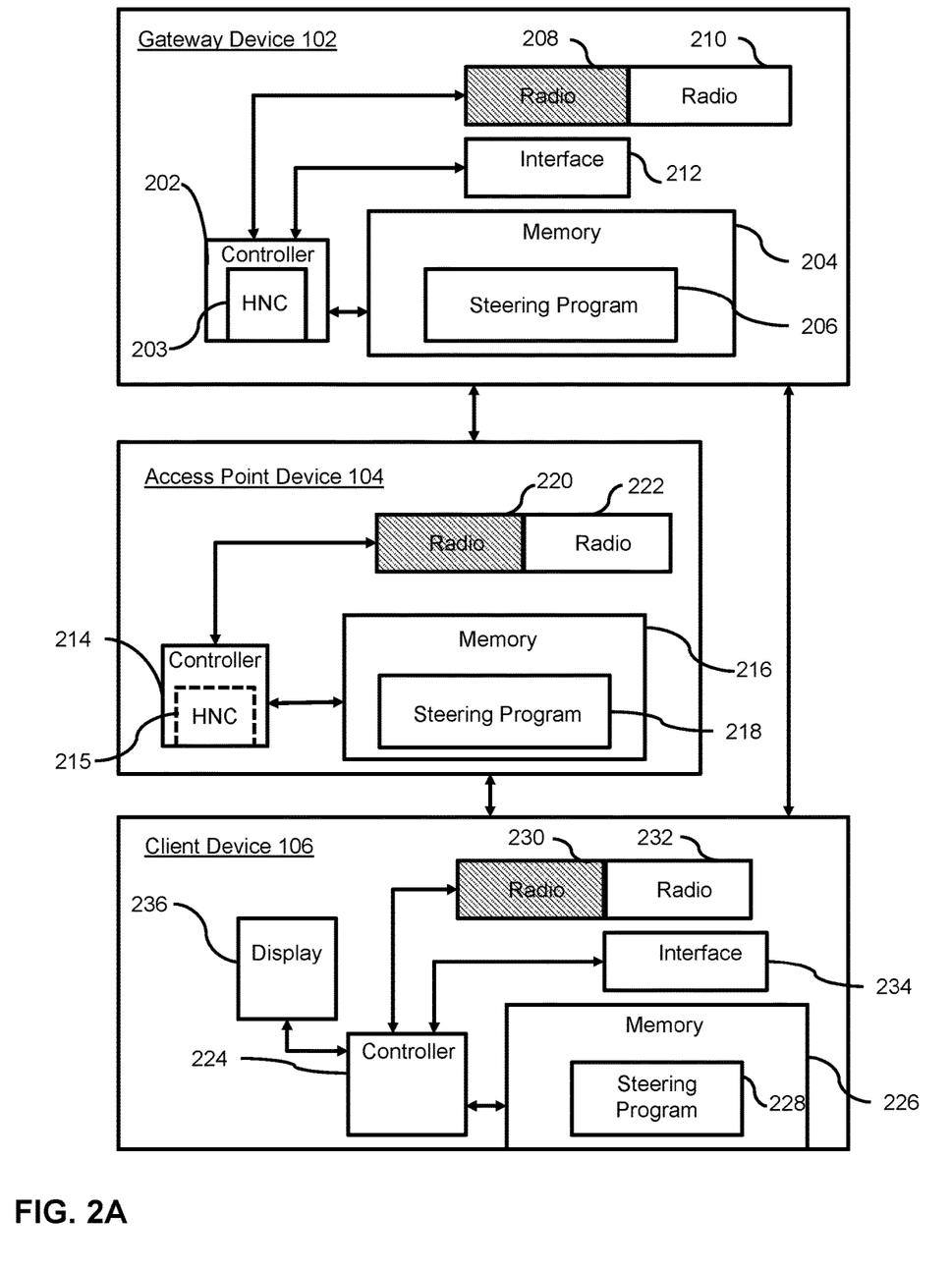
FIG. 2A illustrates an exploded view of a gateway device, an access point device (APD), and a client device at a time $t_1$ in accordance with aspects of the present invention.

FIG. 2A illustrates an exploded view of gateway device 102, APD 104, and client device 106 at a time $t_1$ in accordance with aspects of the present invention.

As shown in FIG. 2A, gateway device 102 includes: a controller 202 having an HNC 203 therein; a memory 204, which has stored therein a steering program 206; a radio 208 and a radio 210; and an interface circuit 212.

In this example, controller 202, memory 204, radio 208, radio 210 and interface circuit 212 are illustrated as individual devices. However, in some embodiments, at least two of controller 202, memory 204, radio 208, radio 210 and interface circuit 212 may be combined as a unitary device. Whether as individual devices or as combined devices, controller 202, memory 204, radio 208, radio 210 and interface circuit 212 may be implemented as any combination of an apparatus, a system and an integrated circuit. Further, in some embodiments, at least one of controller 202, memory 204 and interface circuit 212 may be implemented as a computer having non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from, and write information to the tangible computer-readable media. In the alternative, the tangible computer-readable media may be integral to the processor. The processor and the tangible computer-readable media may reside in an integrated circuit (IC), an application specific integrated circuit (ASIC), or large scale integrated circuit (LSI), system LSI, super LSI, or ultra LSI components that perform a part or all of the functions described herein. In the alternative, the processor and the tangible computer-readable media may reside as discrete components.

Example tangible computer-readable media may be also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules may be located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 202 contains hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 108 in accordance with the embodiments described in the present disclosure.

Memory 204 can store various programming, and user content, and data, including steering program 206.

Steering program 206, as will be described in greater detail below, has instructions stored thereon to be executed by HNC 203, to cause HNC 203 to: count a number, n, of times, within a predetermined period of time, that client device 106 is steered from the first band to the second band and is steered from the second band to the first band; and instruct APD 104 to increase σ when n is greater than a predetermined value, m.

In some embodiments, steering program 206, as will be described in greater detail below, has additional instructions stored thereon to be executed by HNC 203, to cause HNC 203 to: generate a warning message suggesting that a user of client device 106 move; and transmit the warning message to client device 106 by way of APD 104.

In some embodiments, the signal parameter is selected from a group of signal parameters consisting of RSSI level, PHY rate, amplitude level, number of packets dropped, and a combination thereof.

In some embodiments, steering program 206, as will be described in greater detail below, has additional instructions stored thereon to be executed by HNC 203, to cause HNC 203 to: count the number, n, of times, that client device 106 is steered from the first band to the second band and is steered from the second band to the first band by way of a management information base (MIB) or a Technical Report (TR)-069 management protocol.

Interface circuit 212 can include one or more connectors, such as RF connectors, or Ethernet connectors, and/or wireless communication circuitry, such as 5G circuitry and one or more antennas.

Radio 208 and radio 210 may each also be referred to as a wireless communication circuit, such as a Wi-Fi WLAN interface radio transceiver and is operable to communicate with client device 106 and with APD 104. Radio 208 and radio 210 include one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Gateway device 102 can also be equipped with a radio transceiver/wireless communication circuit to implement a wireless connection in accordance with any Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

APD 104 includes: a controller 214, which in optional embodiments include and HNC 215 disposed therein; a memory 216, which has stored therein an steering program 218; and a radio 220 and 222.

In this example, controller 214, memory 216, radio 220, and radio 222 are illustrated as individual devices. However, in some embodiments, at least two of controller 214, memory 216, radio 220 and radio 222 may be combined as a unitary device. Further, in some embodiments, at least one of controller 214 and memory 216 may be implemented as a computer having tangible computer-readable media for carrying or having computer-executable instructions or data structures stored thereon.

Controller 214 can include a dedicated control circuit, CPU, a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of APD 104 in accordance with the embodiments described in the present disclosure.

Memory 216 can store various programming, user content, and data, including steering program 218. Steering program 218, as will be described in greater detail below, has instructions stored thereon to enable APD 104 to steer client device 106 from the 2.4 GHz band to the 5 GHz band and vice versa.

Radios 220 and 222, such as a Wi-Fi WLAN interface radio transceiver, are operable to communicate with client device 106 and with gateway device 102. Radio 220 and radio 222 include one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. APD 104 can also be equipped with a radio transceiver/wireless communication circuit to implement a wireless connection in accordance with any Bluetooth protocols, BL), or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Client device 106 includes: a controller 224; a memory 226, which has stored therein a steering program 228; a radio 230 and 232, and an interface 234.

In this example, controller 224, memory 226, radio 230 and 232, and interface 234 are illustrated as individual devices. However, in some embodiments, at least two of controller 224, memory 226, radio 230, and interface 232 may be combined as a unitary device. Further, in some embodiments, at least one of controller 224 and memory 226 may be implemented as a computer having tangible computer-readable media for carrying or having computer-executable instructions or data structures stored thereon.

Controller 224, which can include a dedicated control circuit, CPU, microprocessor, etc., controls the circuits of client device 106.

Memory 226 can store various programming, user content, and data, including steering program 228. Steering program 228, as will be described in greater detail below, has instructions stored thereon to be executed by controller 224 to cause client device 106 to be steered by APD 104 to the 2.4 GHz band from the 5 GHz band, and vice versa.

Radios 230 and 232 may include a Wi-Fi WLAN interface radio transceiver that is operable to communicate with APD 104 and with gateway device 102. Radios 230 and 232 includes one or more antennas and communicates wirelessly via one or more of the 2.4 GHz band, the 5 GHz band, and the 6 GHz band, or at the appropriate band and bandwidth to implement any IEEE 802.11 Wi-Fi protocols, such as the Wi-Fi 4, 5, 6, or 6E protocols. Client device 106 can also be equipped with a radio transceiver/wireless communication circuit to implement a wireless connection in accordance with any BLE, or other short range protocols that operate in accordance with a wireless technology standard for exchanging data over short distances using any licensed or unlicensed band such as the CBRS band, 2.4 GHz bands, 5 GHz bands, or 6 GHz bands, RF4CE protocol, ZigBee protocol, Z-Wave protocol, or IEEE 802.15.4 protocol.

Radios 208, 220 and 230 are shaded in the figure to represent that they are currently broadcasting/receiving such that client device 106 can communicate with APD 104, which can additionally communicate with gateway device on the 2.4 GHz band.

In operation, HNC 203 will set the offset value for client device 106. The offset value is the minimum difference between the measured signal parameter values that will allow the client device to be steered. Some non-limiting examples of such parameters include RSSI levels, PHY rate, amplitude levels, number of packets dropped, etc. This will be described with greater detail in reference to FIG. 3A.

Figure 3A:
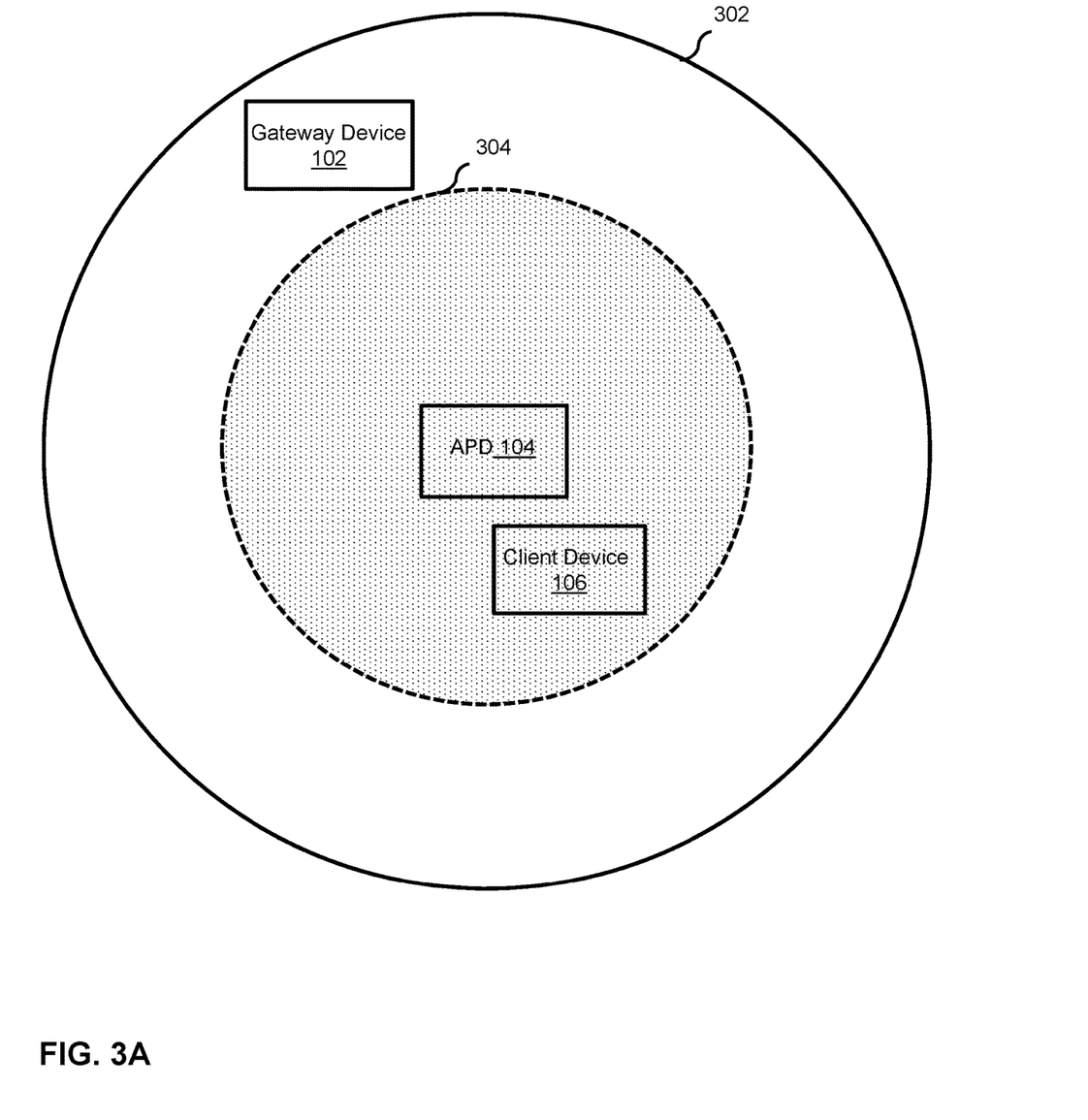
FIG. 3A illustrates a wireless network which includes the gateway device, the APD, the client device of FIG. 2A and two wireless transmission areas at time $t_1$.

FIG. 3A illustrates wireless network 300 which includes gateway device 102, APD 104, client device 106, transmission area 302 and transmission area 304 at a time $t_1$.

Radio 220 broadcasts in a first frequency band that is receivable by client device 106 within a transmission area 302 and receives signals transmitted by client device 106 within the first frequency band from client device 106 within transmission area 302. In an example embodiment, the first frequency that radio 220 transmits and receives is in the 2.4 GHz Wi-Fi band.

Radio 222 broadcasts in a second frequency that is receivable by client device 106 within a transmission area 304 and receives signals transmitted by client device 106 within the second frequency from client device 106 within transmission area 304. In an example embodiment, the first frequency that radio 220 transmits and receives is in the 5 GHz Wi-Fi band.

Each of these bands will transmit (and receive) signals having a respective signal quality, which may be measured by any number of parameters, non-limiting examples of which include RSSI level, PHY rate, amplitude level, number of packets dropped, and a combination thereof. Whichever parameter is used to determine a signal quality, there will be a measureable respective signal parameter value. For purposes of the discussion, assume that the measured signal parameter of the bands is the RSSI level, e.g., the RSSI level as measure between client device 108 and APD 104. The offset value to be set will be the minimum difference between the RSSI levels of transmission area 302 corresponding to the 2.4 GHz band and transmission area 304 corresponding to the 5 GHz band. APD 104 is able to detect the signal parameter value by way of receiving packets from client device 106.

While client device 108 is communicating with APD 104 on the 2.4 GHz band, APD 104 may instruct client device 108 to send a probe on the 5 GHz band. By receiving a probe from client device 106 on the 5 GHz band, APD 104 may then know the RSSI value of the 5 GHz band. Similarly, while client device 108 is communicating with APD 104 on the 5 GHz band, APD 104 may instruct client device 108 to send a probe on the 2.4 GHz band. By receiving a probe from client device 106 on the 2.4 GHz band, APD 104 may then know the RSSI value of the 2.4 GHz band.

In other embodiments, while communicating with client device 108 on the 2.4 GHz band, APD 104 may instruct client device 108 to tentatively steer to the 5 GHz band for a very short interval. This very short interval steer may be triggered when client device 108 is not transmitting data on the 2.4 GHz band, thereby avoiding any negative impact to service. Similarly, while communicating with client device 108 on the 5 GHz band, APD 104 may instruct client device 108 to tentatively steer to the 2.4 GHz band for a very short interval. Again, this very short interval steer may be triggered when client device 108 is not transmitting data on the 5 GHz band, thereby avoiding any negative impact to service.

As shown in FIG. 2A, HNC 203 of gateway device 102 may read instructions within steering program 206 to set the offset value. For purposes of discussion only, let the offset value be 15 dB. It should be noted that in some embodiments the offset value may be set by an offsite service provider (not shown) by any known manner, non-limiting examples of which include a management information base (MIB), TR-069, or multiple system operators (MSO), which is an operator of multiple cable or satellite systems. A MIB is a data structure stored in the HNC that may be accessed and modified by the offsite service provider to set σ. TR-069 is a known management protocol that is used for communication between the offsite service provider and the HNC.

Returning to FIG. 1, after an offset value is set (S104), a timer is set (S106). For purposes of discussion only, let the timer be one hour. For example, as shown in FIG. 2A, HNC 203 of gateway device 102 may read instructions within steering program 206 to start the counter after the offset value is set. The purpose of the timer is to count the number of band steering occurrences within a time frame.

Returning to FIG. 1, after a timer is set (S106), n is set to 0 (S108). As will be described in greater detail below, n will be a counter for the integer number of times that client device 106 is steered from one band to another within the time frame defined by the timer. Initially (at S108), client device 106 has yet to be steered, so n is set to 0.

Figure 3B:
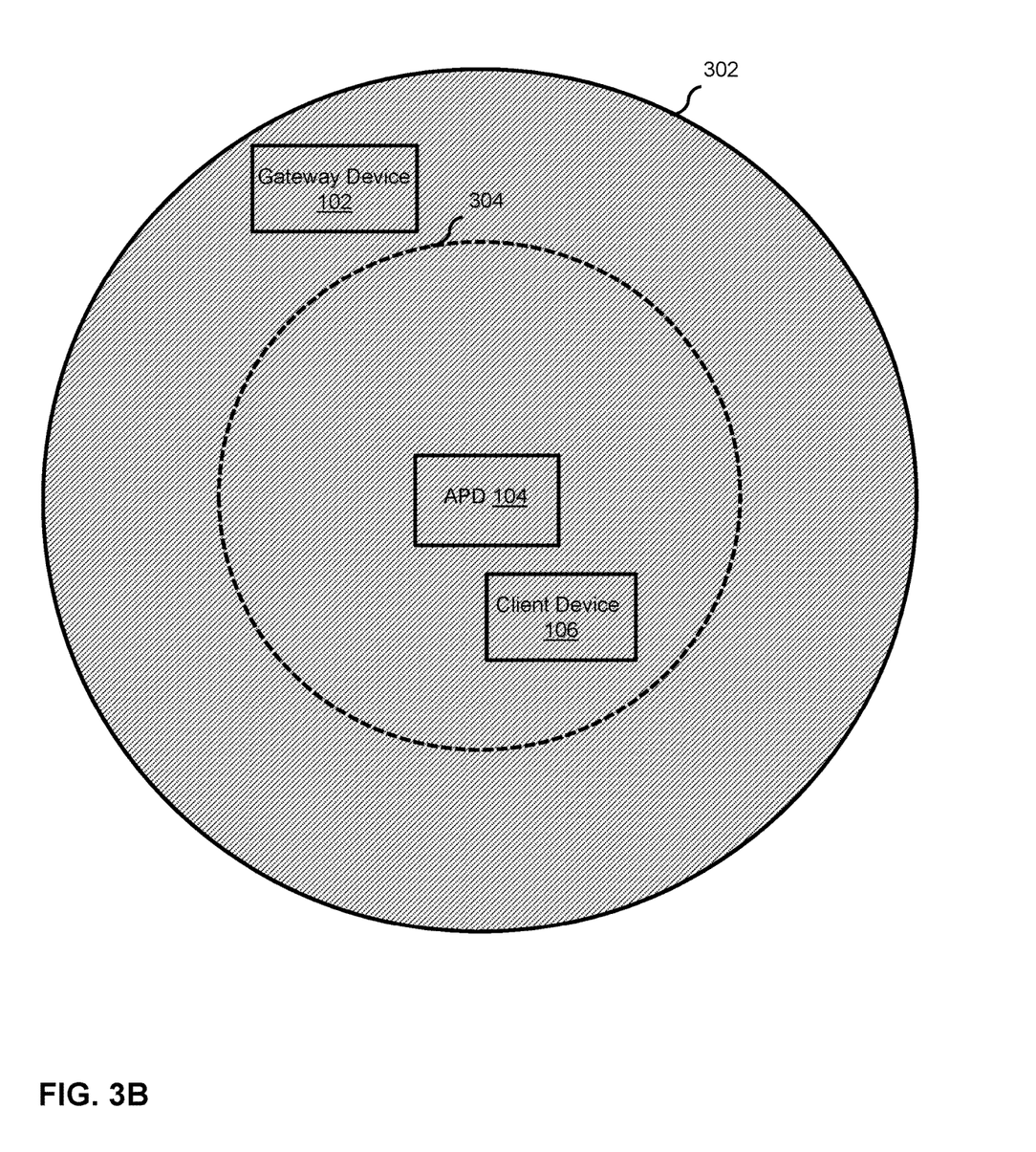
FIG. 3B illustrates the wireless network of FIG. 3A at a time t2.

Returning to FIG. 1, after n is set to 0 (S108), it is determined whether the difference in the measured signal parameter values between the two bands is greater than σ (S110). For example, as shown in FIG. 2A, HNC 203 of gateway device 102 may read instructions within steering program 206 to first determine the difference, $\Delta_{RSSI}$, between the RSSI value of the 2.4 GHz band associated with transmission area 302 (as shown in FIG. 3A) and the RSSI value of the 5 GHz band associated with transmission area 304 (as shown in FIG. 3B). HNC 203 may read instructions within steering program 206 to then compare $\Delta_{RSSI}$ with σ.

Returning to FIG. 1, if it is determined that the difference in the measured signal parameter values between the two bands is not greater than σ (No at S110), than algorithm 100 will continue to check until the difference is greater than the offset value (return to S110). For example, for purposes of discussion only, let the RSSI value of transmission area 302 be −65 dB, and let the RSSI value of transmission area 304 be −54 decibels. Accordingly, in this example, $\Delta_{RSSI}$ would be 11 dB. As mentioned previously, let σ be 15 dB. Therefore, in this example, the value of $\Delta_{RSSI}$ does not exceed σ. Algorithm 100 will continue to monitor $\Delta_{RSSI}$ for transmission area 302 and transmission area 304.

Returning to FIG. 1, if it is determined that the difference in the measured signal parameter values between the two bands is greater than σ (Yes at S110), then the client device is steered (S112). For example, for purposes of discussion, let the RSSI value of transmission area 302 be −70 dB, and let the RSSI value of transmission area 304 be −54 dB, wherein $\Delta_{RSSI}$ would be 16 dB. Further, again, let σ is 15 decibels. In such a case, $\Delta_{RSSI}$ exceeds σ. In other words, the signals transmitted on the 5 GHz band within transmission area 304 are sufficiently better than signals transmitted on the 2.4 GHz band so as to warrant steering client device 106 from the 2.4 GHz band to the 5 GHz band.

In this case HNC 203 may read instructions within steering program 206 to generate a steering instruction, which would be transmitted from radio 208 to radio 220 of APD 104. Controller 214 of APD 104 may read instruction within steering program 218 to then instruct radio 220 to broadcast the steering instruction to radio 230 of client device 106. Controller 224 of client device 106 may read instructions from steering program 228 to disassociate from APD 104 on the 2.4 GHz band and associate with APD 104 using radio 232 on the 5 GHz band. Upon associating with APD 104 on the 5 GHz band, client device 106 is successfully steered.

Returning to FIG. 1 after the client device is steered (S114), n is set to n+1 (S112). This will be described in greater detail with reference to FIG. 2B.

Figure 2B:
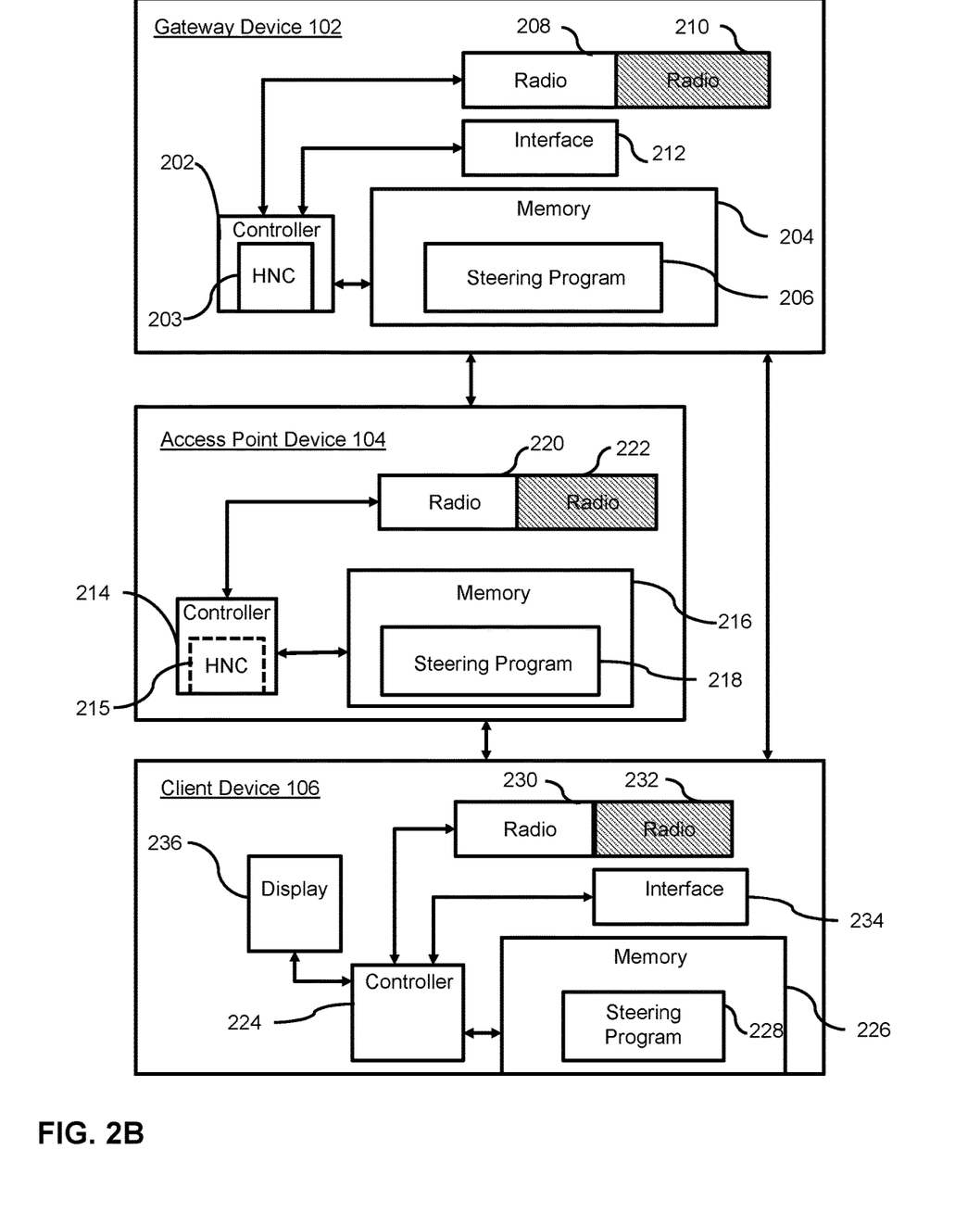
FIG. 2B illustrates an exploded view of the gateway device, the APD, and the client device of FIG. 2A at a time t2.

FIG. 2B illustrates an exploded view of gateway device 102, APD 104, and client device 106 at a time t2 in accordance with aspects of the present invention. As shown in the figure, radios 210, 222 and 232 are shaded in the figure to represent that they are currently broadcasting/receiving such that client device 106 can communicate with APD 104, which can additionally communicate with gateway device on the 5 GHz band. This is illustrated in FIG. 3B, which illustrates gateway device 102, APD 104, client device 106, and transmission area 302 and 304 at a time t2.

Now that client device 106 has been successfully steered, HNC 203 has increased n to 16, it will then steer client device 106 from transmission area 302 to transmission area 304 to provide client device 106 with better service. Then HNC 203 may read instructions from steering program 206 to increase n by a predetermined increment. In a non-limiting example embodiment, n HNC 203 increases n by one decibel to 16.

Returning to FIG. 1 after n has been increased (S114), it is determined whether the timer has expired (S116). For example, as shown in FIG. 2B, HNC 203 HNC 203 may read instructions from steering program 206 to keep track of how many times client device 106 is steered within the time frame as set by the timer (S106) to find the rate at which client device 106 steered.

Returning to FIG. 1, if it is determined that the timer has expired (Yes at S116), then algorithm 100 will restart the timer (return to S106). If the initial hour-long timer has expired, HNC 203 will restart the timer.

However, if it is determined that the timer has not expired (No at S116), then it is determined whether n is greater than m (S118). In other words, has client device 106 been steered, within the predetermined time period set by the timer (S106), more times than a predetermined acceptable threshold of steerings.

For example, as shown in FIG. 2B, HNC 203 may read instructions from steering program 206 to set a threshold number m. Consider the situation where m is set to 50. This means that it would be unacceptable for client device 106 to be steered between the 2.4 GHz associated with transmission area 302 and the 5 GHz band associated with transmission area 304 more than 50 times within the time period set by the timer (S106). Therefore, in this example, should n reach 51 before the timer expires, then client device 106 has been steered 51 times between transmission areas 302 and 304 before the end of the predetermined time period. This in turn means that client device 106 has lost service each of the 51 times within an hour. This is evidence of unacceptable repeated steering between transmission areas 302 and 304.

On the other hand, consider the situation where m is set to 50, and n only reaches 49 before the timer expires. This means that client device 106 has been steered 49 times before the end of the predetermined time period, which is, as evidenced by m being set to 50, an acceptable repeated steering between transmission areas 302 and 304.

Returning to FIG. 1, if it is determined that n is not greater than m (No at S118), algorithm 100 once again checks if the difference in the measured signal parameter values between the two bands is greater than σ (return to S110).

On the other hand, if it is determined that n is greater than m (Yes at S118), then the offset value is increased (S120). For example, if HNC 203 finds that n is greater than m, it will then increase σ. This will then restart the process at the timer being reset (Return to S106).

If σ is increased, then $\Delta_{RSSI}$ will have to also increase in order for client device 106 to be steered. Therefore, increasing σ will lessen the chance of the steering threshold being met. If $\Delta_{RSSI}$ increases, then client device 106 should be steered less times within a predetermined time frame. This decrease in steering will allow for greater overall user experience. If n does not fall below m, algorithm 100 repeats. If σ is increased again (S120), and n continues to be greater than m (Yes at S118), then σ is increased again. Eventually, algorithm 100 will reach a steady state, where client device 106 is not steered too often within the predetermined time frame.

Algorithm 100 addresses a symptom—an over-abundance of client steerings within a predetermined time period. In accordance with another aspect of the present invention, HNC 203 may address the cause of the symptom—poor signal quality between client device 106 and APD 104. In particular, in some embodiments, after σ is increased, HNC 203 may instruct APD 104 to warn client device 106 to move closer to APD 104 to increase the signal quality between client device 106 and APD 104.

For example, as shown in FIG. 2A, HNC 203 of gateway device 102 may read instructions within steering program 206 to instruct radio 208 (or radio 210 if currently transmitting in the 5 GHz band) to transmit a warning signal to radio 220 (or radio 222 if currently transmitting in the 5 GHz band) of APD 104. Upon receipt, controller 214 may read instructions within steering program 218 to instruct radio 220 (or radio 222 if currently transmitting in the 5 GHz band) to transmit the warning signal to radio 230 (or radio 232 if currently transmitting in the 5 GHz band) of client device 106.

Upon receipt, controller 224 may instruct display 236 to display a warning message, based on the warning signal, to the user. In some non-limiting example embodiments, the warning message may alert the user to move closer to APD 104. It should be noted that he warming message may additionally include audio or tactile (vibration) components to additionally warn the user.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

There is an existing algorithm in which HNCs determine when to steer associated client devices between 2.4G and 5G wireless bands, due to poor internet service for the client devices. However, sometimes client devices will be steered multiple times within a time period. This is a problem, as every time a client is steered from one wireless band to another, it must disassociate from the internet. This causes the user to experience constant disconnections, and overall poor user experience. The current algorithm for these HNCs is flawed.

In accordance with the present disclosure, the HNC will count the number of band steering occurrences within a predetermined time period. If the client device is steered too many times within that time frame, the client is unacceptably being steered. A σ will be determined for each connected client device to create a cap of how many times the client should be steered in the predetermined time period. If a client is being bounced between wireless bands at an unreasonable rate, σ will be increased to help prevent this unnecessary steering of client devices.

Thus, the present disclosure as disclosed helps prevent an abundance of unnecessary steering occurrences of client devices, which in turn will allow client devices to have better service and overall user experience.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A home network controller device for use with an access point device and a client device, the access point device being configured to associate with the client device on a first band and on a second band, the access point device being configured to steer the client device from the first band to the second band based on a signal parameter offset value and to steer the client device from the second band to the first band based on the signal parameter offset value, the access point device being configured to determine a first signal parameter value associated with association of the client device on the first band and to determine a second signal parameter value associated with association of the client device on the second band, said home network controller device comprising:
    a memory; and
    a processor configured to execute instructions stored on said memory to cause said home network controller device to:
        count a number, n, of times, within a predetermined period of time, that the client device is steered from the first band to the second band and is steered from the second band to the first band; and
        instruct the access point device to increase the signal parameter offset value when n is greater than a predetermined value, m.

2. The home network controller device of claim 1, wherein the processor is further configured to execute instructions stored on said memory to additionally cause said home network controller device to
    generate a warning message suggesting that a user of the client device move; and
    transmit the warning message to the client device by way of the access point device.

3. The home network controller device of claim 1, wherein the signal parameter is selected from a group of signal parameters consisting of signal strength indicator level, physical layer rate, amplitude level, number of packets dropped, and a combination thereof.

4. The home network controller device of claim 1, wherein the processor is further configured to execute instructions stored on said memory to additionally cause said home network controller device to count the number, n, of times, that the client device is steered from the first band to the second band and is steered from the second band to the first band by way of a management information base or a Technical Report (TR)-069 management protocol.

5. A method of using a home network controller device for use with an access point device and a client device, the access point device being configured to associate with the client device on a first band and on a second band, the access point device being configured to steer the client device from the first band to the second band based on a signal parameter offset value and to steer the client device from the second band to the first band based on the signal parameter offset value, the access point device being configured to determine a first signal parameter value associated with association of the client device on the first band and to determine a second signal parameter value associated with association of the client device on the second band, said method comprising:

counting, via a processor configured to execute instructions stored on a memory, a number, n, of times, within a predetermined period of time, that the client device is steered from the first band to the second band and is steered from the second band to the first band; and     instructing, via the processor, the access point device to increase the signal parameter offset value when n is greater than a predetermined value, m.

6. The method of claim 5, further comprising:

generating, via the processor, a warning message suggesting that a user of the client device move; and     transmitting, via the processor, the warning message to the client device by way of the access point device.

7. The method of claim 5, wherein the signal parameter is selected from a group of signal parameters consisting of signal strength indicator level, physical layer rate, amplitude level, number of packets dropped, and a combination thereof.

8. The method of claim 5, further comprising counting, via the processor, the number, n, of times, that the client device is steered from the first band to the second band and is steered from the second band to the first band by way of a management information base or a Technical Report (TR)-069 management protocol.

9. A non-transitory computer-readable medium having computer-readable instructions stored thereon, the computer-readable instructions being capable of being read by a home network controller device for use with an access point device and a client device, the access point device being configured to associate with the client device on a first band and on a second band, the access point device being configured to steer the client device from the first band to the second band based on a signal parameter offset value and to steer the client device from the second band to the first band based on the signal parameter offset value, the access point device being configured to determine a first signal parameter value associated with association of the client device on the first band and to determine a second signal parameter value associated with association of the client device on the second band, wherein the computer-readable instructions are capable of instructing the home network controller device to perform the method comprising:

counting, via a processor configured to execute instructions stored on a memory, a number, n, of times, within a predetermined period of time, that the client device is steered from the first band to the second band and is steered from the second band to the first band; and     instructing, via the processor, the access point device to increase the signal parameter offset value when n is greater than a predetermined value, m.

10. The non-transitory computer-readable medium of claim 9, wherein the computer-readable instructions are capable of instructing the home network controller device to perform the method further comprising:

generating, via the processor, a warning message suggesting that a user of the client device move; and     transmitting, via the processor, the warning message to the client device by way of the access point device.

11. The non-transitory computer-readable medium of claim 9, wherein the computer-readable instructions are capable of instructing the server device to perform the method wherein the signal parameter is selected from a group of signal parameters consisting of signal strength indicator level, physical layer rate, amplitude level, number of packets dropped, and a combination thereof.

12. The non-transitory computer-readable medium of claim 9, wherein the computer-readable instructions are capable of instructing the server device to perform the method further comprising counting, via the processor, the number, n, of times, that the client device is steered from the first band to the second band and is steered from the second band to the first band by way of a management information base or a Technical Report (TR)-069 management protocol.

* * * * *